(12) United States Patent
Griesbach et al.

(10) Patent No.: US 9,435,073 B2
(45) Date of Patent: Sep. 6, 2016

(54) ELECTROCHEMICAL TEXTILE-WASHING PROCESS

(71) Applicant: BASF SE, Ludwigshafen (DE)

(72) Inventors: Ulrich Griesbach, Mannheim (DE); Steffen Maas, Bubenheim (DE); Florian Stecker, Mannheim (DE); Andreas Fischer, Heppenheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/452,768

(22) Filed: Aug. 6, 2014

(65) Prior Publication Data

US 2014/0346057 A1   Nov. 27, 2014

Related U.S. Application Data

(62) Division of application No. 13/070,879, filed on Mar. 24, 2011, now abandoned.

(60) Provisional application No. 61/317,299, filed on Mar. 25, 2010.

(51) Int. Cl.
| | | |
|---|---|---|
| C08B 15/02 | (2006.01) | |
| C11D 11/00 | (2006.01) | |
| D06F 35/00 | (2006.01) | |
| D06L 1/12 | (2006.01) | |
| D06L 3/04 | (2006.01) | |
| D06F 1/12 | (2006.01) | |

(52) U.S. Cl.
CPC ............... D06L 3/04 (2013.01); C08B 15/02 (2013.01); C11D 11/0017 (2013.01); D06F 1/12 (2013.01); D06F 35/003 (2013.01); D10B 2201/02 (2013.01); D10B 2501/00 (2013.01)

(58) Field of Classification Search
CPC . C08B 15/02; C11D 11/0017; D06F 35/003; D06L 1/12; D06L 3/04; D10B 2201/02; D10B 2501/00
USPC .......................... 68/3 R, 12.02; 8/158, 159
See application file for complete search history.

(56) References Cited

U.S. PATENT DOCUMENTS

| | | | |
|---|---|---|---|
| 3,645,669 A | 2/1972 | Rausch | |
| 3,871,982 A | 3/1975 | Idstein | |
| 3,887,806 A | 6/1975 | Rodak et al. | |
| 4,604,224 A | 8/1986 | Cheng | |
| 5,227,446 A | 7/1993 | Denzinger et al. | |
| 5,360,569 A | 11/1994 | Madison et al. | |
| 5,399,286 A | 3/1995 | Funhoff et al. | |
| 5,756,456 A | 5/1998 | Ho et al. | |
| 6,387,238 B1 | 5/2002 | Merk et al. | |
| 2002/0166177 A1 | 11/2002 | Hamand | |
| 2005/0252255 A1 | 11/2005 | Gray et al. | |
| 2006/0288743 A1* | 12/2006 | van Kralingen et al. | 68/147 |
| 2008/0134727 A1 | 6/2008 | May | |
| 2008/0148784 A1 | 6/2008 | Ikematsu et al. | |
| 2008/0251108 A1 | 10/2008 | Nagai et al. | |

FOREIGN PATENT DOCUMENTS

| | | | |
|---|---|---|---|
| CN | 101818108 A | 9/2010 | |
| DE | 41 06 355 A1 | 9/1992 | |
| DE | 43 13 909 A1 | 11/1994 | |
| DE | 44 15 623 A1 | 11/1995 | |
| EP | 0 021 491 A1 | 1/1981 | |
| EP | 0 038 591 A1 | 10/1981 | |
| EP | 0 001 004 B1 | 2/1982 | |
| EP | 0 087 035 A1 | 8/1983 | |
| EP | 0 384 070 A2 | 8/1990 | |
| EP | 0 396 303 A2 | 11/1990 | |
| EP | 0 451 508 A1 | 10/1991 | |
| EP | 0 453 003 A2 | 10/1991 | |
| EP | 0 454 126 A1 | 10/1991 | |
| EP | 0 522 726 A1 | 1/1993 | |
| EP | 0 581 452 A1 | 2/1994 | |
| EP | 0 511 037 B1 | 9/1994 | |
| EP | 0 656 914 B1 | 1/1997 | |
| EP | 1036874 A2 * | 9/2000 | .......... C02F 1/46109 |
| EP | 1 739 207 A2 | 1/2007 | |
| EP | 2 088 231 A1 | 8/2009 | |
| EP | 2 098 627 A1 | 9/2009 | |
| EP | 2 098 628 A1 | 9/2009 | |
| GB | 2 013 259 A | 8/1979 | |
| JP | 3079421 U | 8/2001 | |
| JP | 3089585 U | 10/2002 | |
| JP | 2003-211104 | 7/2003 | |
| JP | 2004-358274 | 12/2004 | |
| JP | 2005-146344 | 6/2005 | |
| WO | WO 92/16493 | 10/1992 | |
| WO | WO 93/22362 | 11/1993 | |
| WO | WO 94/01486 | 1/1994 | |
| WO | WO 94/21777 | 9/1994 | |
| WO | WO 94/24251 | 10/1994 | |
| WO | WO 2009/067838 A2 | 6/2009 | |
| WO | WO 2010/003934 A1 | 1/2010 | |

OTHER PUBLICATIONS

International Search Report issued Jul. 7, 2011, in PCT/EP2011/054542 (with English Translation of Categories of Cited Documents).

* cited by examiner

*Primary Examiner* — Michael Barr
*Assistant Examiner* — Levon J Shahinian
(74) *Attorney, Agent, or Firm* — Oblon, McClelland, Maier & Neustadt, L.L.P (57) ABSTRACT

The present invention relates to a washing machine comprising an electrochemical cell, to a process for electrochemical cleaning of fibers, to laundry detergents for electrochemical cleaning of fibers and to the fibers thus cleaned.

5 Claims, 1 Drawing Sheet

A Schematic Presentation of the Experimental Apparatus

ELECTROCHEMICAL TEXTILE-WASHING PROCESS

CROSS REFERENCE TO RELATED APPLICATIONS

The present application is a divisional of U.S. patent application Ser. No. 13/070,879, filed on Mar. 24, 2011, which claims priority to U.S. Provisional application Ser. No. 61/317,299, filed Mar. 25, 2010, the entire contents of each of which are hereby incorporated by reference.

The present invention relates to a washing machine comprising an electrochemical cell, to a process for electrochemical cleaning of fibers, to laundry detergents for electrochemical cleaning of fibers and to the fibers thus cleaned.

There has been a steadily growing awareness in recent years on the part of the population as to human influence on the environment. Waste avoidance, reduction and recycling are prominent concerns and are becoming ever more important. A large proportion of emissions in the private sphere is associated with textile cleaning and care, for which complex laundry detergent mixtures are used. Since some ingredients of these laundry detergents can have adverse consequences for the environment in the long term, the demand for less environmentally hazardous laundry detergents is increasing. Yet reducing the ingredients shall not lead to a reduced washing performance. One solution resides in specific laundry detergents for certain colors or fibers, but leads to an increased number of laundry detergents in households and therefore is not very consumer-friendly.

Alternatively, performance of the washing machines can be increased.

Especially the bleachingly active compounds represent a challenge. Current laundry detergents include bleach catalysts or bleach precursors and a peroxide source, ensuring that the bleach is only activated during the wash.

One challenge in formulating a laundry detergent is to protect the sensitive ingredients of the laundry detergent (examples being enzymes and perfumes) from the bleach components.

One possible way to do this is to protect the sensitive ingredients from the influence of the bleach by encapsulation. This is particularly difficult to do in the case of liquid laundry detergents, where a reaction medium is already present in the formulation in the form of water. Separating bleach components and sensitive substances is here often only accomplished with the aid of stock reservoir containers comprising sophisticatedly engineered and not very user-friendly multicompartment systems. It further needs to be ensured that the bleach is only formed during the wash and not already beforehand, since bleachingly active substances, such as hydrogen peroxide for example, are unstable under the alkaline conditions typically present, decomposing with gas evolution. Furthermore, many bleach components used in pulverulent laundry detergents are not sufficiently soluble in liquid laundry detergents.

One possible way to overcome the limitations described is the in situ generation of bleachingly active substances in the washing machine. It is known to electrolytically generate hydrogen peroxide (U.S. Pat. No. 6,387,238) and react the hydrogen peroxide with TAED (tetraacetylethylenediamine) to form peracetic acid, known to be a bleachingly active compound. US 2002/0,166,177 describes a washing machine that includes a peroxide generator. EP 1 739 207 claims an electrolysis unit for in situ generation of peroxide and its use in the field of textile bleaching. The use of diamond electrodes in divided cells in conjunction with textile washing is described in JP 2003 211 104. The diamond electrodes here are used for the electrochemical treatment of the wash water at the end of the wash cycle in the manner of a wastewater treatment (TOC degradation). In a further aspect, electrolysis is used to form acidic (anolyte) and basic (catholyte) water in order to achieve a superior washing result through sequential and repeated use of these washing solutions.

However, all the systems are based on a divided electrolytic cell. A divided electrolytic cell, in addition to a membrane, also requires additional containers and pumps in order that the various circuits (anolyte and catholyte) may be operated separately from each other. The fluxes of material through permeation and electro-osmosis, i.e., through transportation of solvent molecules dragged as solvate shell and through a friction effect with the ions through the membrane, have to be appropriately balanced out. The membrane can erode in places where the flow rate is high, and can even be destroyed through "hot spots" when locally increased current densities occur. Direct contact of the (flexible) membranes with the electrodes, more particularly the anode, is harmful in the long term, and has to be prevented through technical measures. After installation, the membranes must not be allowed to become dry again, since cracks can form inter alia. When sparingly soluble salts are present in the electrolyte (wash water, wash liquor), the free acids or bases may in certain circumstances crystallize out in the membrane and thus lead to holes and cracks. Owing to the increasing complexity of the system, therefore, it is not just the capital cost which rises for the end-user, but also the cost of maintenance as well as the energy consumption due to the additional pumps, structural components and control units. Technical realization of the frequently used gas-diffusion electrodes in the private sphere and the frequently very limited operating life of the membranes (risk of hair cracks, loss of permselectivity) inhibit wide dissemination of the systems. In addition, the frequently used gas-diffusion electrode consumes oxygen for generating hydrogen peroxide. Oxygen, however, has only a limited solubility in water (specifically at elevated temperature) and has to be permanently replenished by introduction of air. Surfactant-containing washing solutions tend to foam, which is further amplified by additional blowing in of air and can damage the machine.

The use of diamond electrodes in the context of bleach activation has hitherto not been described. Boron-doped diamond electrodes have hitherto been customarily used in wastewater treatment (TOC degradation), where the aggressive free OH radicals formed at this electrode attack and oxidize organic material as far as $CO_2$. Therefore, appreciable color and fiber damage was to be expected to occur on use in textile-washing machines.

In principle, electrochemical processes are used in a series of applications. In the most frequent applications, individual chemicals are specifically converted into others. Bond cleavages, dimerizations, couplings and so on can be carried out electrochemically, for example.

Electrochemical processes have hitherto not been commercially used in the field of textile washing. Reasons include that not all necessary equipment parameters have been researched; heavy-metal electrodes have hitherto been used, always leading to an input of heavy metal into the wash liquor; and that to date there are no laundry-detergent formulations specifically developed for wash processes of this type.

It is an object of the present invention to provide a system for cleaning fibers—and more particularly textiles—which satisfies the technical prerequisites as well as the chemical ones.

We have found that this object is achieved, surprisingly, by the washing machine according to claims 1 to 4, the process according to claims 5 to 9, the laundry detergent according to claim 10 and also the fibers according to claim 11, since it was found that, surprisingly, boron-doped diamond electrodes can be used for textile bleaching even though these electrodes, typically used in wastewater treatment (TOC degradation), were expected to give rise to appreciable color and fiber damage, required no more than a pre-electrolysis of the water (prior to the addition of laundry detergent, bleach activator and textile fabric) for bleach activation, thereby appreciably reducing the energy requirements (10 min pre-electrolysis compared with 30 min-60 min sustained electrolysis during the washing operation), and what is more, sensitive constituents of the laundry detergent and the clothes do not have to be unnecessarily exposed to the electrodes/free OH radicals, an integration of an electrolytic cell in the external supply of water is possible, the electrochemical activation of bleach is also compatible with liquid laundry detergents, it is possible to use an undivided cell, which is very simple in its construction and low maintenance and therefore very advantageous over divided cells, and nor are any additional containers, pumps, membranes, etc needed, good bleaching results can be obtained even at low washing temperatures (<40° C.), and the use of the electrode in the washing machine has hygienic advantages.

The present invention accordingly provides a washing machine comprising an electrode and a closed-loop control unit, wherein a current strength in the range from 0.02 to 30 A can be applied to the electrode during the washing operation.

Preference is given to a washing machine where the current strength which can be applied is in the range from 0.1 to 16 A and more preferably from 0.3 to 10 A.

And preference is given to a washing machine where the current strength is applied during the filling and/or washing operation.

The current strength can vary over time. Preferred embodiments according to the present invention have a constant current strength or a variable course for the current strength.

The type of washing machine comprises all types of washing machines, i.e., not only domestic washing machines but also washing machines for industrial fiber and more particularly textile cleaning. Washing machines have been extensively described, for example in EP 2 098 627 and EP 2 098 628.

The electrode materials, more particularly anode materials, used in the electrochemical cell are preferably materials with which a high oxygen overvoltage can be achieved, examples being noble metals such as platinum or metal oxides such as ruthenium oxide, chromium oxide or lead oxide or mixed oxides of the type $RuO_xTiO_x$ or conventional dimensionally stable anodes (DSAs) or diamond electrodes.

The electrode is preferably selected from the group consisting of graphite electrode, diamond electrode, steel electrode and platinum electrode.

Diamond electrodes are preferred. They are formed by applying one or more layers of diamond to a carrier material. Useful carrier materials include niobium, silicon, tungsten, titanium, silicon carbide, tantalum, graphite or ceramic carriers such as titanium suboxide. However, the process or method of the present invention preferably utilizes a carrier composed of niobium, titanium or silicon, and a carrier composed of niobium is very particularly preferred when a diamond electrode is used.

The anode is preferably a diamond electrode, in which case the diamond electrode can also additionally be doped with further metals. Boron and nitrogen are preferred for use as doping metals. The process or method of the present invention is very particularly preferred using a boron-doped diamond (BDD) electrode as anode.

The electrolysis can be carried out using any conventional electrolytic cell comprising the electrodes mentioned—such as divided or undivided continuous flow cells, capillary cells or stacked plate cells. An undivided continuous flow cell is particularly preferred. A bipolar arrangement of two or more electrodes is advantageous for achieving optimum space-time yields.

It was further found, then, that diamond electrodes behave similarly to heavy-metal electrodes under the conditions of fiber and more particularly textile washing.

The process or method of the present invention therefore has the advantage that no metal ions pass into the electrolyte (i.e., the wash liquor) and hence the environment, since no heavy-metal ions can form in the corrosion of the diamond layer of the BDD electrode.

Diamond electrodes obtained by chemical vapor deposition (CVD) can be used. Such electrodes are commercially available, for example from: Condias, Itzehoe (Germany) and/or Adamant Technologies, La-Chaux-de-Fonds (Switzerland).

Less costly diamond electrodes produced by the high-temperature high-pressure (HTHP) process (industrial diamond powder is mechanically incorporated in the surface of a carrier metal) are likewise suitable.

HTHP-BDD electrodes are commercially available from pro aqua, Niklasdorf (Austria), and their properties are described by A Cieciwa, R. Wüthrich and Ch. Comninellis in Electrochem. Commun. 8 (2006) 375-382.

With regard to electrode type, therefore, a washing machine where the electrode is a diamond electrode is preferred.

Useful cathode materials, unless electrode polarity is to be interchanged, include for example iron, steel, stainless steel or nickel, otherwise also precious metals such as platinum, and also diamond electrodes. Preference, however, is given to using boron-doped diamond electrodes as cathode.

The process or method of the present invention is preferably carried out using a diamond electrode as cathode. This diamond electrode comprises a layer of diamond applied to a carrier material, the carrier material being selected from the group consisting of niobium, silicon, tungsten, titanium, silicon carbide, tantalum, graphite or ceramic carriers such as titanium suboxide. The carrier material is more preferably niobium or silicon. The diamond layer on the carrier can additionally be doped with further elements. Preference is given to boron- or nitrogen-doped diamond electrodes. Boron-doped diamond electrodes are particularly preferred.

Very particular preference is given to the combination of boron-doped diamond electrode as anode with steel as cathode, in which case more particularly the washing-machine casing of steel acts as cathode. The steel used is more particularly stainless steel.

In another preferred embodiment, the washing machine comprises two diamond electrodes, connected as anode and cathode.

When the anode(s) and cathode(s) are diamond electrodes, the electrolysis can also be carried out in intervals and, optionally, the polarity of the electrodes interchanged (short-term electrolysis, washing operation, short-term electrolysis, washing operation, etc). One advantage of this intermittent operation is that sensitive constituents of the laundry detergent would be only briefly exposed to possible degradation at the electrodes (primarily through free OH radicals).

The process or method of the present invention is advantageous when the poling of the diamond electrodes is interchanged in the range from 0.1 to 200 min or from wash to wash to avoid electrode fouling.

The individual electrodes are of a certain size which affects the effect. Preference is given to a washing machine wherein the individual electrode has an effective surface area in the range from 0.5 to 1000 $cm^2$, preferably in the range from 1 to 500 $cm^2$ and more preferably in the range from 2 to 100 $cm^2$. The electrode size here is based on the surface area of the individual electrode which during the electrolysis is connected as anode and faces the cathode. When an anode is positioned between two cathodes, the electrode size of the anode is the sum total of the front and reverse surfaces. The effective electrode area of the individual electrode is the electrode area of the anode which during the electrolysis comes into contact with the electrolyte and faces the cathode(s).

When two electrodes are connected such that they can function alternatingly as an anode or as cathode, the values resulting for the overall electrode area are accordingly twice as large.

The effective areas of the anode(s) and cathode(s) are preferably of equal size, which is particularly preferable when the anode(s) and the cathode(s) alike are diamond electrodes. The electrodes are arranged a certain distance apart. A distance of 0.1-20 mm is preferred, a distance of 1-10 mm is preferable and of 2-5 mm is more preferable.

An electrolytic cell according to the present invention comprises a pair of electrodes which are preferably not separated from each other by a membrane. A bipolar arrangement of two or more electrodes is advantageous to optimize the space-time yields.

Inside the washing machine, the cell is installed in the flooded region of the washing tub, preferably outside the washing drum. However, the cell can also be mounted in the supply line inside or outside the washing machine. The cell can be a fixedly installed constituent of the washing machine or a separate component (for example in the fresh-water supply line between the stop cock and the washing machine, or as an e-bleach ball with its own energy supply in the drum). Such a kit of parts comprising a washing machine and an electrolytic cell connectable upstream at the water inlet constitutes a further part of the subject matter of the present invention. A further embodiment according to the present invention consists in integrating the electrolytic cell in an additional water circuit within the machine.

An e-bleach ball, comprising a power supply independent of the electricity grid, a diamond anode and a cathode, which are arranged such that the electrodes are able to come into contact with the electrolyte when the e-bleach ball is in the washing drum of a washing machine during the washing operation, forms a further part of the subject matter of the present invention.

The present invention further provides a process for cleaning fibers, which comprises generating free OH radicals and $H_2O_2$ in aqueous solution by applying a current strength in the range from 0.02 to 30 A to an electrode.

The process or method of the present invention utilizes an electrolyte selected from the group consisting of water, methanol and ethanol. Water is particularly preferred.

In the process or method of the present invention, the pH is in the range from 2 to 13, preferably in the range from 3 to 12 and more preferably in the range from 6 to 11.

The temperature for the process or method of the present invention is in the range from 10 to 95° C., preferably in the range from 15 to 90° C., more preferably in the range from 20 to 60° C. and even more preferably in the range from 25 to 40° C., such as 30° C. for example.

Further general parameters of such a process or method are discernible from EP 2 088 231 for example.

Preference is further given to a process wherein the electrode is a diamond electrode having an effective surface area in the range from 0.5 to 1000 $cm^2$, preferably in the range from 1 to 500 $cm^2$ and more preferably in the range from 2 to 100 $cm^2$.

A process wherein at least one compound selected from the group consisting of builder, surfactant and enzyme is used for cleaning as well as the free OH radicals (or its descendent products such as hydrogen peroxide and ozone), constitutes a preferred version.

These compounds are preferably included in the laundry detergent of the present invention. Nonexhaustive examples of builders, surfactants and enzymes are recited there.

Preference is further given to a process carried out at a temperature up to 60° C., preferably up to 40° C. and more preferably up to 30° C.

A process as described above that has an at least 20% degree of soil removal for bleachable stains (tea for example) forms a further part of the subject matter of the present invention.

The degree of soil removal is determined as follows: A white cotton test fabric is initially stained and is subjected to a reflectance measurement at 460 nm before and after performance of the process or method, i.e., before and after washing. Soil removal is determined from the reflectance values R before and after performance of the process or method and the reflectance value of a white reference cotton fabric as per the following formula, in %:

$$\text{Degree of soil removal } [\%] = \frac{R(\text{after wash}) - R(\text{before wash})}{R(\text{white cotton}) - R(\text{before wash})} \times 100$$

All washes are carried out twice and averaged.

The reflectance measurements are carried out using a Gretag Macbeth Spectrolino spectrophotometer under the following conditions: observer angle 10°, illuminant D65, UV filter.

A laundry detergent, more particularly a fully built laundry detergent, comprising bleach activator(s) and/or bleach catalyst(s) and less than 1% by mass of hydrogen peroxide or of hydrogen peroxide releaser compounds, is a further part of the present invention.

Similarly, a liquid laundry detergent comprising bleach activator(s) and/or bleach catalyst(s) is part of the subject matter of the present invention. The liquid laundry detergent contains the bleach activator in an amount of at least 0.01% to 10% by mass, preferably from 0.1% to 5% by mass and more preferably from 0.5% to 3% by mass. The bleach activator is preferably selected from the hereinbelow recited suitable bleach activators. The bleach activator TAED is particularly preferred.

A prespotter comprising bleach activator(s) and/or bleach catalyst(s) forms a further part of the subject matter of the present invention. The prespotter comprises the bleach activator in an amount of at least 0.01% to 50% by mass, preferably from 0.1% to 30% by mass and more preferably from 0.5% to 10% by mass. The bleach activator is preferably selected from the hereinbelow recited suitable bleach activators. The bleach activator TAED is particularly preferred.

Useful bleach activators include:
polyacylated sugars, e.g., pentaacetyl glucose;
acyloxybenzenesulfonic acids and their alkali and alkaline earth metal salts, e.g., sodium p-isononanoyloxybenzenesulfonate or sodium p-benzoyloxybenzenesulfonate;
acyloxybenzoic acids and their alkali and alkaline earth metal salts, e.g., sodium p-nonanoyloxybenzoic acid or sodium p-decanoyloxybenzoic acid;
N,N-diacylated and N,N,N',N'-tetraacylated amines, e.g., N,N,N',N'-tetraacetylmethylenediamine and -ethylenediamine (TAED), N,N-diacetylaniline, N,N-diacetyl-p-toluidine or 1,3-diacylated hydantoins such as 1,3-diacetyl-5,5-dimethylhydantoin;
N-alkyl-N-sulfonylcarboxamides, e.g., N-methyl-N-mesylacetamide or N-methyl-N-mesylbenzamide;
N-acylated cyclic hydrazides, acylated triazols or urazols, e.g., monoacetylmaleic hydrazide;
O,N,N-trisubstituted hydroxylamines, e.g., O-benzoyl-N,N-succinylhydroxylamine, O-acetyl-N,N-succinylhydroxylamine or O,N,N-triacetylhydroxylamine;
N,N'-diacylsulfurylamides, e.g., N,N'-dimethyl-N,N'-diacetylsulfurylamide or N,N'-diethyl-N,N'-dipropionylsulfurylamide;
triacyl cyanurates, e.g., triacetyl cyanurate or tribenzoyl cyanurate;
carboxylic anhydrides, e.g., benzoic anhydride, m-chlorobenzoic anhydride, or phthalic anhydride;
1,3-diacyl-4,5-diacyloxyimidazolines, e.g., 1,3-diacetyl-4,5-diacetoxyimidazoline;
tetraacetylglycoluril and tetrapropionylglycoluril;
diacylated 2,5-diketopiperazines, e.g., 1,4-diacetyl-2,5-diketopiperazine;
acylation products of propylene diurea and 2,2-dimethylpropylene diurea, e.g., tetraacetylpropylene diurea;
α-acyloxypolyacylmalonamides, e.g., α-acetoxy-N,N'-diacetylmalonamide;
diacyldioxohexahydro-1,3,5-triazines, e.g., 1,5-diacetyl-2,4-dioxohexahydro-1,3,5-triazine;
ammonium nitriles, e.g., N-methylmorpholinioacetonitrile hydrogensulfate or trimethylammonioacetonitrile hydrogensulfate;
benz(4H)1,3-oxazin-4-ones having alkyl radicals, for example methyl, or aromatic radicals, for example phenyl, in position 2.

The laundry detergent of the present invention may optionally further comprise bleach catalysts. Useful bleach catalysts include for example quaternized imines and sulfonimines, described for example in U.S. Pat. No. 5,360,569 and EP-A 0 453 003. Particularly efficacious bleach catalysts are manganese complexes, described for example in WO-A 94/21777. Such compounds, if used in laundry detergents, are incorporated at not more than 1.5% by weight, more particularly not more than 0.5% by weight. Further suitable metal catalysts are mentioned in Angew. Chem. 2006, 118, 212-229, for example.

To improve the conductivity of the basic electrolyte, conducting salts can be added during the process or method and most simply as a constituent of the laundry detergent. Useful conducting salts include for example quaternary, preferably bisquaternary ammonium salts. Particular preference is given to the conducting salts selected from the group consisting of bis-N,N'-(tri $C_1$-$C_8$-alkyl)-substituted tri-, tetra-, penta-, hexa-, etc—methylenediammonium salts such as hexamethylenebis(dibutylethylammonium) phosphate or hydroxide. Very particular preference is given to using hexamethylenebis(dibutylethylammonium) phosphate or hydroxide as conducting salt. If desired, the electrolyte is additionally admixed with certain additives, such as EDTA or triethanolamine, preferably by admixture to the laundry detergent of the present invention, in order that the cathodic deposition of iron, which would have an adverse effect on the desired high hydrogen overvoltage of the cathode, may be controlled. Borates such as disodium diborate or orthoboric acid can be added as anode corrosion inhibitors.

Builders

Useful inorganic builders (A') include, in particular, crystalline or amorphous aluminosilicates having ion-exchanging properties such as, more particularly, zeolites.

Various types of zeolites are suitable, more particularly zeolites A, X, B, P, MAP and HS in their Na form or in forms in which Na has been partially exchanged for other cations such as Li, K, Ca, Mg or ammonium. Useful zeolites are described for example in EP-A 0 038 591, EP-A 0 021 491, EP-A 0 087 035, U.S. Pat. No. 4,604,224, GB-A 2 013 259, EP-A 0 522 726, EP-A 0 384 070 and WO-A 94/24251.

Useful crystalline silicates (A') include for example disilicates or sheet-silicates, for example SKS-6 (from Hoechst). Silicates can be used in the form of their alkali metal, alkaline earth metal or ammonium salts, preferably as sodium, lithium and magnesium silicates.

Amorphous silicates such as, for example, sodium metasilicate, which has a polymeric structure, or Britesil® H20 (from Akzo) can likewise be used.

Suitable inorganic builder substances based on carbonate are carbonates and bicarbonates. These can be used in the form of their alkali metal, alkaline earth metal or ammonium salts. Preference is given to using sodium, lithium and magnesium carbonates or bicarbonates, more particular sodium carbonate and/or sodium bicarbonate.

Customary phosphates useful as inorganic builders are polyphosphates such as pentasodium triphosphate, for example.

The recited compounds (A') can be used individually or mixed with each other. Of particular interest for use as an inorganic builder component is a mixture of aluminosilicates and carbonates, more particularly of zeolites, especially zeolite A, and alkali metal carbonates, especially sodium carbonate, in a weight ratio ranging from 98:2 to 20:80, more particularly ranging from 85:15 to 40:60. In addition to this mixture, other components (A') can be additionally present.

In a preferred embodiment, the laundry detergent of the present invention comprises 0.1% to 20% by weight and more particularly 1% to 12% by weight of organic cobuilders (B') in the form of low molecular weight, oligomeric or polymeric carboxylic acids, more particularly polycarboxylic acids, or phosphonic acids or salts thereof, more particularly sodium or potassium salts.

Suitable low molecular weight carboxylic acids or phosphonic acids for (B') are for example:

$C_4$-$C_{20}$ di-, tri- and tetracarboxylic acids such as for example succinic acid, propanetricarboxylic acid, butanetetracarboxylic acid, cyclopentanetetracarboxylic acid and alkyl- and alkenylsuccinic acids having $C_2$-$C_{16}$ alkyl or alkenyl radicals;

$C_4$-$C_{20}$ hydroxy carboxylic acids such as for example malic acid, tartaric acid, gluconic acid, glutaric acid, citric acid, lactobionic acid and sucrosemono-, -di- and -tricarboxylic acid;

amino polycarboxylic acids such as for example nitrilotriacetic acid, β-alaninediacetic acid, ethylenediaminetetraacetic acid, serinediacetic acid, isoserinediacetic acid, methylglycinediacetic acid and alkyl ethylenediaminetriacetates;

salts of phosphonic acids such as hydroxyethanediphosphonic acid, for example.

Suitable oligomeric or polymeric carboxylic acids for (B') are for example:

oligomaleic acids as described for example in EP-A 451 508 and EP-A 396 303;

co- and terpolymers of unsaturated $C_4$-$C_8$ dicarboxylic acids comprising units derived from monoethylenically unsaturated monomers of group (i) in amounts of up to 95% by weight,
of group (ii) in amounts of up to 60% by weight, and
of group (iii) in amounts of up to 20% by weight.

Useful unsaturated $C_4$-$C_8$ dicarboxylic acids here include for example maleic acid, fumaric acid, itaconic acid and citraconic acid. Maleic acid is preferred.

Group (i) comprises monoethylenically unsaturated $C_3$-$C_8$ monocarboxylic acids such as for example acrylic acid, methacrylic acid, crotonic acid and vinylacetic acid. Preference among group (i) is given to using acrylic acid and methacrylic acid.

Group (ii) comprises monoethylenically unsaturated $C_2$-$C_{22}$ olefins, vinyl alkyl ethers having $C_1$-$C_8$ alkyl groups, styrene, vinyl esters of $C_1$-$C_8$ carboxylic acids, (meth)acrylamide and vinylpyrrolidone. Preference among group (ii) is given to using $C_2$-$C_6$ olefins, vinyl alkyl ethers having $C_1$-$C_4$ alkyl groups, vinyl acetate and vinyl propionate.

Group (iii) comprises (meth)acrylic esters of $C_1$-$C_8$ alcohols, (meth)acrylonitrile, (meth)acrylamides of $C_1$-$C_8$ amines, N-vinylformamide and vinylimidazole.

When the polymers of group (ii) comprise units derived from vinyl esters, these units may also be in a state of partial or complete hydrolysis to vinyl alcohol structural units. Suitable co- and terpolymers are known for example from U.S. Pat. No. 3,887,806 and also DE-A 43 13 909.

Dicarboxylic acid copolymers useful for (B') are preferably:

copolymers of maleic acid and acrylic acid in a weight ratio ranging from 10:90 to 95:5 and more preferably those in a weight ratio ranging from 30:70 to 90:10 with molar masses of 100 000 to 150 000;

terpolymers of maleic acid, acrylic acid and a vinyl ester of a $C_1$-$C_3$ carboxylic acid in a weight ratio of 10 (maleic acid):90 (acrylic acid+vinyl ester) to 95 (maleic acid):10 (acrylic acid+vinyl ester), wherein the weight ratio of acrylic acid to vinyl ester can range from 30:70 to 70:30;

copolymers of maleic acid with $C_2$-$C_8$ olefins in a molar ratio ranging from 40:60 to 80:20, in which case copolymers of maleic acid with ethylene, propylene or isobutene in a molar ratio of 50:50 are particularly preferred.

Graft polymers of unsaturated carboxylic acids on low molecular weight carbohydrates or hydrogenated carbohydrates, cf. U.S. Pat. No. 5,227,446, DE-A 44 15 623 and DE-A 43 13 909, are likewise useful as (B').

Useful unsaturated carboxylic acids here are for example maleic acid, fumaric acid, itaconic acid, citraconic acid, acrylic acid, methacrylic acid, crotonic acid and vinylacetic acid, and also mixtures of acrylic acid and maleic acid, which are grafted onto the component to be grafted, in amounts of 40% to 95% by weight, based on the component to be grafted.

By way of modification, an additional up to 30% by weight, based on the component to be grafted, of further monoethylenically unsaturated monomers can be present in copolymerized form. Suitable modifying monomers are the abovementioned monomers of groups (ii) and (iii).

Useful grafting bases include degraded polysaccharides such as for example acidic or enzymatically degraded starches, inulins or cellulose, protein hydrolyzates and reduced (hydrogenated or reductively aminated) degraded polysaccharides such as for example mannitol, sorbitol, aminosorbitol and N-alkylglucamine, and also polyalkylene glycols having molar masses of up to $M_w$=5000 such as for example polyethylene glycols, ethylene oxide-propylene oxide or ethylene oxide-butylene oxide or ethylene oxide-propylene oxide-butylene oxide block copolymers and alkoxylated mono- or polyhydric $C_1$-$C_{22}$ alcohols, cf. U.S. Pat. No. 5,756,456.

Preference among this group is given to using grafted degraded or degraded reduced starches and grafted polyethylene oxides, in which case 20% to 80% by weight of monomers, based on the graft component, are used in the graft polymerization. Grafting preferably utilizes a mixture of maleic acid and acrylic acid in a weight ratio ranging from 90:10 to 10:90.

Polyglyoxylic acids useful as (B') are described for example in EP-B 001 004, U.S. Pat. No. 5,399,286, DE-A 41 06 355 and EP-A 0 656 914. The end groups of the polyglyoxylic acids can have different structures.

Polyamidocarboxylic acids and modified polyamidocarboxylic acids useful as (B') are known for example from EP-A 454 126, EP-B 511 037, WO-A 94/01486 and EP-A 581 452.

Useful as (B') are also in particular polyaspartic acids or cocondensates of aspartic acid with further amino acids, $C_4$-$C_{25}$ mono- or dicarboxylic acids and/or $C_4$-$C_{25}$ mono- or diamines. Particular preference is given to using polyaspartic acids prepared in phosphorus-containing acids and modified with $C_6$-$C_{22}$ mono- or dicarboxylic acids and/or with $C_6$-$C_{22}$ mono- or diamines.

Condensation products useful as (B') of citric acid with hydroxy carboxylic acids or polyhydroxy compounds are known for example from WO-A 93/22362 and WO-A 92/16493. Such carboxyl-containing condensates typically have molar masses of up to 10 000, preferably up to 5000.

Ethylenediaminedisuccinic acid, oxydisuccinic acid, amino polycarboxylates, amino polyalkylene phosphonates and polyglutamates are further useful as (B').

Oxidized starches can be used as organic cobuilders in addition to (B').

Surfactants

Useful anionic surfactants (C) include for example fatty alcohol sulfates of fatty alcohols having 8 to 22 and preferably 10 to 18 carbon atoms, for example $C_9$-$C_{11}$ alcohol sulfates, $C_{12}$-$C_{14}$ alcohol sulfates, cetyl sulfate, myristyl sulfate, palmityl sulfate, stearyl sulfate and tallow fatty alcohol sulfate.

Further useful anionic surfactants include alkanesulfonates such as $C_8$-$C_{24}$ and preferably $C_{10}$-$C_{18}$ alkanesulfonates and also soaps such as for example the sodium and potassium salts of $C_8$-$C_{24}$ carboxylic acids.

Further suitable anionic surfactants are $C_9$-$C_{20}$ linear alkylbenzenesulfonates (LASs) and alkyltoluenesulfonates.

Useful anionic surfactants (C) further include $C_8$-$C_{24}$ olefinsulfonates and -disulfonates, which can also constitute mixtures of alkene- and hydroxyalkanesulfonates or -disulfonates, alkyl ester sulfonates, sulfonated polycarboxylic acids, alkyl glycerol sulfonates, fatty acid glycerol ester sulfonates, alkylphenol polyglycol ether sulfates, paraffinsulfonates having about 20 to about 50 carbon atoms (based on paraffin or paraffin mixtures recovered from natural sources), alkyl phosphates, acyl isethionates, acyl taurates, acyl methyltaurates, alkylsuccinic acids, alkenylsuccinic acids or their monoesters or monoamides, alkylsulfosuccinic acids or their amides, mono- and diesters of sulfosuccinic acids, acyl sarcosinates, sulfated alkylpolyglucosides, alkylpolyglycol carboxylates and also hydroxyalkylsarcosinates.

Anionic surfactants are preferably included in the fiber- and textile-treating agent in the form of salts. Suitable cations in these salts are alkali metal ions such as sodium, potassium and lithium and ammonium salts such as for example hydroxyethylammonium, di(hydroxyethyl)ammonium and tri(hydroxyethyl)ammonium salts.

The amount in which component (C) is present in the fiber- and textile-treating agent of the present invention is preferably in the range from 3% to 30% by weight and more particularly in the range from 5% to 20% by weight. When $C_9$-$C_{20}$ linear alkylbenzenesulfonates (LASs) are also used, these are typically used in an amount up to 25% by weight, especially up to 20% by weight. It is possible to use just one class of anionic surfactants alone, for example just fatty alcohol sulfates or just alkylbenzenesulfonates, but it is also possible to use mixtures of different classes, for example a mixture of fatty alcohol sulfates and alkylbenzenesulfonates. Within the individual classes of anionic surfactants, it is also possible to use mixtures of different species.

A further class of useful surfactants is that of nonionic surfactants D, more particularly alkylphenol alkoxylates such as alkylphenol ethoxylates having $C_6$-$C_{14}$ alkyl chains and from 5 to 30 mol of alkylene oxide units.

Another class of nonionic surfactants is that of alkylpolyglucosides or hydroxyalkylpolyglucosides having 8 to 22 and preferably 10 to 18 carbon atoms in the alkyl chain. These compounds comprise usually from 1 to 20 and preferably from 1.1 to 5 glucoside units. Another class of nonionic surfactants is that of N-alkylglucamides having $C_6$-$C_{22}$ alkyl chains. Such compounds are obtained for example by acylation of reductively aminated sugars with appropriate long-chain carboxylic acid derivatives.

Useful nonionic surfactants (D) further include block copolymers of ethylene oxide, propylene oxide and/or butylene oxide (Pluronic® and Tetronic® brands from BASF), polyhydroxy or polyalkoxy fatty acid derivatives such as polyhydroxy fatty acid amides, N-alkoxy or N-aryloxy polyhydroxy fatty acid amides, fatty acid amide ethoxylates, more particularly end group capped ones, and also fatty acid alkanolamide alkoxylates.

The amount in which component (D) is present in the fiber- and textile-treating agent of the present invention is preferably in the range from 1% to 20% by weight and more particularly in the range from 3% to 12% by weight. It is possible to use just one class of nonionic surfactants alone, more particularly just alkoxylated $C_8$-$C_{22}$ alcohols, but it is also possible to use mixtures of different classes. Within the individual classes of nonionic surfactants it is also possible to use mixtures of different species.

Since the balance between the recited surfactant varieties is of significance for the efficacy of the fiber- and textile-treating agents of the present invention, anionic surfactants (C) and nonionic surfactants (D) are preferably in a weight ratio ranging from 95:5 to 20:80 and more particularly ranging from 80:20 to 50:50. The surfactant constituents of the surfactant mixture of the present invention must also be taken into account here.

It is further also possible for cationic surfactants (E) to be present in the fiber- and textile-treating agents of the present invention.

Useful cationic surfactants include for example ammonio-containing surface-active compounds such as for example, alkyldimethylammonium halides and compounds of the general formula where R to R''' are each alkyl, aryl, alkylalkoxy, arylalkoxy, hydroxyalkyl(alkoxy), hydroxyaryl(alkoxy) and X is a suitable anion.

The fiber- and textile-treating agents of the present invention may optionally also comprise ampholytic surfactants (F), for example aliphatic derivatives of secondary or tertiary amines which comprise an anionic group in one of the side chains, alkyldimethylamine oxides or alkyl- or alkoxymethylamine oxides.

Components (E) and (F) can be present in the fiber- and textile-treating agent at up to 25%, preferably 3-15%.

Enzymes

In a further preferred embodiment, the fiber- and textile-treating agent of the present invention additionally comprises 0.05% to 4% by weight of enzymes (J). Enzymes used in fiber- and textile-treating agents are preferably proteases, amylases, lipases and cellulases. The enzymes are preferably added in amounts of 0.1-1.5% by weight, more preferably 0.2% to 1.0% by weight, of the formulated enzyme. Examples of suitable proteases are Savinase and Esperase (from Novo Nordisk). Lipolase (from Novo Nordisk) is an example of a suitable lipase. Celluzym (from Novo Nordisk) is an example of a suitable cellulase. It is similarly possible to use peroxidases to activate the bleach system. It is possible to use individual enzymes or a combination of different enzymes. If desired, the textile-washing agent formulation of the present invention may further comprise enzyme stabilizers, for example calcium propionate, sodium formate or boric acids or salts thereof, and/or antioxidants.

A fiber treated by the process or method of the present invention or contacted with a laundry detergent of the present invention constitutes a further part of the subject matter of the present invention. The fibers can be not only natural fibers but also synthetic fibers. Nonexhaustive examples of natural fibers are: cotton, wool, linen and viscose fibers; nonexhaustive examples of synthetic fibers are: polypropene, polyamide, polyester, nylon-6,6, nylon-6, Teflon®, Lycra® fibers.

The fibers are preferably in a woven, loop-drawingly knitted, spun, loop-formingly knitted, knotted, bobbin-laced state.

The present invention will now be more particularly elucidated by examples which do not restrict the subject matter of the invention:

EXAMPLES

Figure 1:
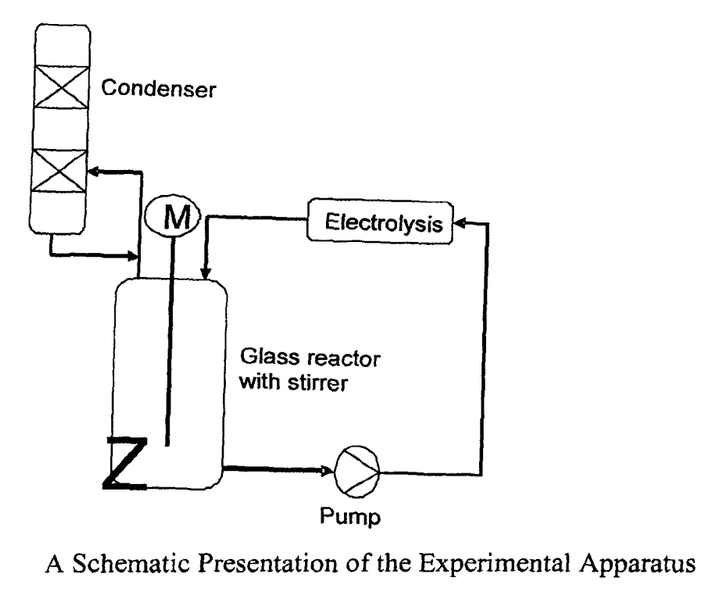
FIG. 1 shows a schematic presentation of the experiment apparatus used in the examples.

Experimental Setup 1000 mL jacketed glass vessel equipped with mechanical stirrer (IKA stirring motor with glass stirrer and mobile PTFE stirring blade) and liquid circuit (Iwaki magnetic pump MD6-230GS01, 80-90 L/h) and an electrolysis cell with boron-doped diamond electrodes (Adamant miniDia-Cell, diamond on silicon, 12.5 cm² electrode area). The test fabrics were introduced into the jacketed vessel at the start.

To evaluate the results of the electrochemical bleach, reference experiments were carried out with a comparative system of hydrogen peroxide ($H_2O_2$) and tetraacetylethylenediamine (TAED) without electrolysis. The concentration ranges chosen correspond to those of commercially available laundry detergents, in which TAED is currently widely used. The reference system used is a mixture of $H_2O_2$ and TAED in a ratio of 4:1 (mmol/L).

The reference experiments involved solutions of $H_2O_2$ and TAED in completely ion-free water being prepared and recirculated at 40° C. without electrolysis. After 30 minutes, the fabric samples were removed, thoroughly rinsed with completely ion-free water, dried in the absence of light and measured for reflectance as a measure of soil removal.

The washing liquid of reference experiment R3 has the following composition: 700 g of completely ion-free water, 10 g of $NaHCO_3$, 0.32 g of $H_2O_2$ solution (30% $H_2O_2$ in water), 0.16 g of TAED (4:1 mmol/L).

The washing liquid for the inventive experiments with active electrolysis typically has the following composition: 700 g of completely ion-free water, 10 g of $NaHCO_3$, 0.16 g of TAED.

Soil removal was determined by subjecting the test fabric to a reflectance measurement at 460 nm before and after washing. The soil or color removal was determined from the reflectance values R before and after washing and also the reflectance value of a white reference cotton fabric as per the following formula in %:

$$\text{Soil removal } [\%] = \frac{R(\text{after wash}) - R(\text{before wash})}{R(\text{white cotton}) - R(\text{before wash})} \times 100$$

All washes were carried out 2x. The soil removal values recited in the table under the wash results correspond to the average of measurements obtained under identical conditions.

The reflectance measurements were carried out using a Gretag Macbeth Spectrolino spectrophotometer under the following conditions: observer angle 10°, illuminant D65, UV filter.

Reference Example R 1 and Example 1

Reference example R 1 describes the soil removal brought about solely by the washing solution (700 g of completely ion-free water, 10 g of $NaHCO_3$). This experiment constitutes a reference for determining the soil removal achieved.

Example 1 describes the bleaching effect achieved by electrolysis of the washing solution (700 g of completely ion-free water, 10 g of $NaHCO_3$) at boron-doped diamond electrodes without the addition of a bleach activator or bleach precursor such as TAED for example. Compared with reference test R 1, a significant increase in soil removal is observed.

TABLE 1

Soil removal exemplified for EMPA 167 test fabric (tea on cotton).

| Example | Electrolysis time | Soil removal in % at 40° C. (reflectance measurement at 460 nm) 30 min |
|---|---|---|
| R1 | —[a] | 12 |
| 1 | 30 min[b] | 26 |

[a]700 g of completely ion-free water, 10 g of $NaHCO_3$
[b]30 min electrolysis at 1.2 A (700 g of completely ion-free water, 10 g of $NaHCO_3$).

Examples 2 to 6

Examples 2 to 6 demonstrate the soil removal (EMPA 167 test fabric, tea on cotton) achieved as a function of the current strength using the inventive process/method in the presence of TAED bleach activator.

TABLE 2

Influence of current strength on soil removal (tea on cotton, EMPA 167).

| Example | Current strength | Soil removal in % at 40° C.[a] (reflectance measurement at 460 nm) Electrolysis time 30 min |
|---|---|---|
| 2 | 0.06 A | 29 |
| 3 | 0.12 A | 47 |
| 4 | 0.6 A | 49 |
| 5 | 1.2 A | 59 |
| 6 | 6.0 A | 67 |

[a]The electrolyte used (washing liquid) typically has the following composition: 700 g of completely ion-free water, 10 g of $NaHCO_3$, 0.16 g of TAED The results reflect the influence of the current strength on soil removal. It was found that the soil removal achieved increases with increasing current strength.

Reference Examples R 2 to R 4

Reference examples R 2 to R 4 represent the results of bleaching with a system of $H_2O_2$ and TAED in differing composition. The washing solution with an addition of $H_2O_2$/TAED in a concentration ratio of 4:1 (mmol/l) thus corresponds to a composition frequently used in commercially available washing powders.

TABLE 3

Influence of composition of $H_2O_2$/TAED on soil removal as exemplified for EMPA 167 test fabric (tea on cotton).

| Example | $H_2O_2$/TAED [mmol/L] | Soil removal in % at 40° C. (reflectance measurement at 460 nm) Run time 30 min |
|---|---|---|
| R2 | 8/1 | 72 |
| R3 | 4/1 | 64 |
| R4 | 4/0.5 | 59 |

It was found, as expected, that increasing the $H_2O_2$ concentration to 8/1 (R 2) results in greater soil removal, since the formation of peracetic acid from TAED is favored. It was similarly found that the degree of soil removal likewise depends on the available amount of TAED. Halving the TAED concentration from 4/1 (R 3) to 4/0.5 (R 4) thus leads to a decrease in soil removal from 64% to 59%.

Comparing soil removal due to electrochemical bleach activation with the results of the reference tests shows that the electrochemical process achieves a degree of soil removal comparable to that of the H$_2$O$_2$/TAED 4:1 (mmol/l) system (about 60% soil removal after 30 minutes at 40° C., see Example 5).

Examples 7 and 8

Examples 7 and 8 describe the difference between sequential splitting of the two steps (Example 7) and parallelization of electrolysis and cleaning operation (Example 8) on the soil removal result.

TABLE 4

Influence of electrolysis time on soil removal (EMPA 167 test fabric)

| Example | Pre-electrolysis [min]/ electrolysis [min] | Soil removal in % at 40° C. (reflectance measurement at 460 nm) 30 min after TAED addition |
|---|---|---|
| 7 | 10/0 | 46 |
| 8 | 10/30 | 61 |

The standard procedure was to move the washing solution past the electrodes at 1.2 A throughout the entire reaction time, and very good soil removal was achieved (Example 5). Surprisingly, very good soil removal was likewise achieved when the washing solution was recirculated at 1.2 A for 10 minutes before addition of TAED and test fabric. After the current source was switched off, TAED and test fabric were added, followed by recirculation for 30 minutes without further application of electric current (Example 7). This effect is very advantageous since very good soil removal can be achieved with a lower input of current. Soil removal can be increased to 61% when the washing solution is recirculated at 1.2 A for 10 minutes before addition of TAED and test fabric and the electrolysis is continued for 30 minutes after the addition of TAED and test fabric (Example 8).

Examples 9 to 12 and Reference Examples R 5 and R 6

Examples 9 to 12 and also Reference Examples R 5 and R 6 describe the treatment of various stain types with the inventive process for electrochemical bleach activation. The results show that the soil removal achieved varies, as expected, with regard to different stains. Comparative examples R 5 and R 6 each describe the pure washing effect in the absence of TAED and without electrolysis. They show that the process of the present invention gives good soil removal not only with regard to red wine (Examples 9 and 10) but also with regard to blueberry juice (Examples 11 and 12).

TABLE 5

Soil removal exemplified for EMPA 114 test fabric (red wine on cotton).

| Example | Current strength [A] | Soil removal in % at 40° C. (reflectance measurement at 460 nm) Run time from addition of TAED and/ or test cloth: 30 min |
|---|---|---|
| 9 | 1.2$^a$ | 55 |
| 10 | 1.2$^b$ | 64 |
| R5 | —$^c$ | 39 |

$^a$30 min electrolysis at 1.2 A without addition of TAED.
$^b$10 min pre-electrolysis at 1.2 A, then addition of TAED (1 mmol/L based on total volume of washing solution), 30 min recirculation without further electrolysis at 40° C.
$^c$30 min recirculation at 40° C. without electrolysis (700 g of completely ion-free water, 10 g of NaHCO$_3$)

TABLE 6

Soil removal exemplified for WFK 10 WB test fabric (blueberry on cotton).

| Example | Current strength [A] | Soil removal in % at 40° C. (reflectance measurement at 460 nm) Run time from addition of TAED and/or test cloth: 30 min |
|---|---|---|
| 11 | 1.2$^a$ | 84 |
| 12 | 1.2$^b$ | 83 |
| R6 | —$^c$ | 53 |

$^a$30 min electrolysis at 1.2 A without addition of TAED.
$^b$10 min pre-electrolysis at 1.2 A, then addition of TAED (1 mmol/L based on total volume of washing solution), 30 min recirculation without further electrolysis at 40° C.
$^c$30 min recirculation at 40° C. without electrolysis (700 g of completely ion-free water, 10 g of NaHCO$_3$)

Examples 13 to 26 and Reference Examples R 7 to R 20

Examples 13-26 and also Reference Examples R 7-R 20 describe the treatment of various textile colors with the inventive process for electrochemical bleach activation. To this end, a solution of 15.4 g of sodium bicarbonate in 1084 g of completely ion-free water was electrolyzed at 40° C. and 1.2 A for 10 minutes. Next 0.25 g of TAED and the color monitors were added, before electroless recirculation for 45 minutes. After every washing operation, the color monitors were briefly rinsed off with completely ion-free water and after every 5 wash cycles subjected to a reflectance measurement at 460 nm to determine the degree of color removal. Altogether, 15 wash cycles (3×5) were carried out per color monitor. As Table 7 shows, the inventive process surprisingly does not give rise to any significant color damage within the error of measurement. One exception is the fabric dyed with Sulphur Black 1 (AISE-1) (Example 13), which tends to lose color/bleed even in a wash liquor without bleach and without electrolysis.

TABLE 7

Investigations concerning color damage by the inventive process using selected color monitors after 15 wash cycles.

| | | Color removal in % | | |
|---|---|---|---|---|
| Example | Color monitor | 5 wash cycles | 10 wash cycles | 15 wash cycles |
| 13 | AISE-1 | 3% | 7% | 13% |
| 14 | AISE-3 | −3% | −3% | −3% |
| 15 | AISE-5 | −4% | −5% | −5% |
| 16 | AISE-8 | −1% | −1% | −1% |
| 17 | AISE-16 | −1% | −1% | −1% |
| 18 | AISE-20 | 1% | 1% | 3% |
| 19 | AISE-21 | 0% | 0% | 1% |
| 20 | AISE-22 | 1% | 2% | 3% |
| 21 | AISE-24 | −22% | −20% | −17% |
| 22 | AISE-26 | 3% | 3% | 5% |
| 23 | AISE-27 | −1% | 0% | 0% |
| 24 | AISE-29 | 0% | 0% | 0% |
| 25 | AISE-33 | 0% | 0% | 0% |
| 26 | AISE-39 | 0% | 0% | 0% |

The results of the inventive process were compared with a simplified reference system. To investigate color removal from selected textile colors, the color monitors were stirred in a system of 15.4 g of sodium bicarbonate, 1085 g of completely ion-free water, 0.25 g of TAED and 0.44 g of hydrogen peroxide solution (30% of H$_2$O$_2$ in water) at 40° C. for 45 minutes. The results of the reference tests are summarized in Table 8. Again, as mentioned above, a very pronounced change is noticeable (R 7) for the color monitor dyed with Sulphur Black 1 (AISE-1). Comparison of the other data shows that the reference system generally leads to greater color damage than the inventive process.

TABLE 8

Investigations concerning color damage by a reference system using selected color monitors after 15 wash cycles.

| Example | Color monitor | 5 wash cycles | 10 wash cycles | 15 wash cycles |
|---|---|---|---|---|
| R7 | AISE-1 | 9% | 21% | 32% |
| R8 | AISE-3 | −4% | −4% | −4% |
| R9 | AISE-5 | −4% | −5% | −6% |
| R10 | AISE-8 | −1% | −1% | −1% |
| R11 | AISE-16 | −1% | −1% | −1% |
| R12 | AISE-20 | 3% | 5% | 8% |
| R13 | AISE-21 | 1% | 2% | 3% |
| R14 | AISE-22 | 3% | 7% | 11% |
| R15 | AISE-24 | −26% | −23% | −22% |
| R16 | AISE-26 | 4% | 6% | 8% |
| R17 | AISE-27 | −1% | 0% | 0% |
| R18 | AISE-29 | 0% | 1% | 1% |
| R19 | AISE-33 | 0% | 0% | 0% |
| R20 | AISE-39 | 0% | 0% | 0% |

We claim:

1. A process for cleaning fibers, the process comprising: generating free OH radicals and/or $H_2O_2$ in aqueous solution comprising a surfactant by applying a current strength in the range from 0.02 to 30 A to an electrode, to form a washing solution containing the surfactant and free OH radicals and/or $H_2O_2$; and contacting the washing solution with fibers, thereby cleaning the fibers, wherein the electrode is a diamond electrode having an effective surface area in the range from 0.5 to 1000 $cm^2$.

2. The process according to claim 1, wherein the aqueous solution further comprises at least one compound selected from the group consisting of a builder and an enzyme.

3. The process according to claim 1, wherein the process is carried out at a temperature of up to 60° C.

4. The process according to claim 1, having an at least 20% degree of soil removal for bleachable stains.

5. The process according to claim 1, wherein the diamond electrode is a boron-doped diamond electrode.

* * * * *